United States Patent
Wang

(10) Patent No.: US 9,658,416 B2
(45) Date of Patent: May 23, 2017

(54) PHOTOELECTRIC CONVERTER AND PHOTOELECTRIC CONNECTION DEVICE

(71) Applicant: Zhejiang Rainbow Fish Communications Technology Co., Ltd., Hangzhou, Zhejiang (CN)

(72) Inventor: Hao Wang, Zhejiang (CN)

(73) Assignee: Zhejiang Rainbow Fish Communications Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 14/913,208

(22) PCT Filed: Aug. 18, 2014

(86) PCT No.: PCT/CN2014/084600
§ 371 (c)(1),
(2) Date: Feb. 19, 2016

(87) PCT Pub. No.: WO2015/024489
PCT Pub. Date: Feb. 26, 2015

(65) Prior Publication Data
US 2016/0202433 A1    Jul. 14, 2016

(30) Foreign Application Priority Data

Aug. 22, 2013 (CN) .......................... 2013 1 0367669

(51) Int. Cl.
*G02B 6/32*     (2006.01)
*H04B 10/40*    (2013.01)
(Continued)

(52) U.S. Cl.
CPC ............. *G02B 6/4246* (2013.01); *G02B 6/32* (2013.01); *G02B 6/428* (2013.01); *G02B 6/4245* (2013.01);
(Continued)

(58) Field of Classification Search
USPC ........................................................ 398/139
See application file for complete search history.

(56) References Cited

U.S. PATENT DOCUMENTS

2005/0259907 A1* 11/2005 Tan ........................ H04B 10/61
 385/11
2007/0053311 A1    3/2007 Kim et al.
(Continued)

FOREIGN PATENT DOCUMENTS

CN         1929343 A      3/2007
CN       201134808 Y     10/2008
(Continued)

OTHER PUBLICATIONS

Chinese Office Action for Application No. 201310367669.X dated Sep. 30, 2016.
(Continued)

*Primary Examiner* — David Payne
*Assistant Examiner* — Omar S Ismail
(74) *Attorney, Agent, or Firm* — Honigman Miller Schwartz and Cohn LLP

(57) ABSTRACT

A photoelectric converter and a photoelectric connection device are provided. The photoelectric converter comprises a housing, wherein a driving controller, at least one information transmitting chip and at least one information receiving chip are provided on a substrate in the housing. The information transmitting chip, under the control of the driving controller, converts an electrical signal to be transmitted to an optical signal and transmits the optical signal through an optical fiber corresponding to the information transmitting chip. The information receiving chip, under the control of the driving controller, converts an external input optical signal that has reached a receiving surface of the information receiving chip to an electrical signal and outputs the electrical signal, wherein the external input optical signal
(Continued)

is transmitted through an optical fiber corresponding to the information receiving chip. Information transmitting chips and information receiving chips are provided in the same photoelectric converter, each information transmitting chip transmitting information through a corresponding optical fiber and each information receiving chip receiving information through a corresponding optical fiber, thus multi-channel optical fiber transmission can be integrally achieved.

9 Claims, 3 Drawing Sheets

(51) Int. Cl.
  *H04B 10/25* (2013.01)
  *G02B 6/42* (2006.01)
(52) U.S. Cl.
  CPC ......... *G02B 6/4257* (2013.01); *G02B 6/4295* (2013.01); *H04B 10/25* (2013.01); *H04B 10/2503* (2013.01); *H04B 10/40* (2013.01); *G02B 6/4214* (2013.01); *G02B 6/4249* (2013.01); *G02B 6/4292* (2013.01)

(56) References Cited

U.S. PATENT DOCUMENTS

| | | | | |
|---|---|---|---|---|
| 2009/0169219 | A1* | 7/2009 | Nakano | G02B 6/43 398/200 |
| 2012/0175502 | A1* | 7/2012 | Yu | G02B 6/4292 250/208.2 |
| 2013/0064499 | A1* | 3/2013 | Satoh | G02B 6/4214 385/14 |

FOREIGN PATENT DOCUMENTS

| | | |
|---|---|---|
| CN | 101995616 A | 3/2011 |
| CN | 102033273 A | 4/2011 |
| CN | 102667565 A | 9/2012 |
| CN | 102854580 A | 1/2013 |
| CN | 102998754 A | 3/2013 |
| CN | 103048744 A | 4/2013 |
| CN | 103048746 A | 4/2013 |
| CN | 103140786 A | 6/2013 |
| CN | 103597392 A | 2/2014 |

OTHER PUBLICATIONS

International Search Report for Application PCT/CN2014/084600 dated Nov. 28, 2014.

* cited by examiner

PHOTOELECTRIC CONVERTER AND PHOTOELECTRIC CONNECTION DEVICE

TECHNICAL FIELD

The present invention relates to the field of information transmission, particularly to a photoelectric converter and a photoelectric connection device.

BACKGROUND

With the development of science and technology, optical fiber, which is a transmission medium, is increasingly introduced into the current field of signal transmission. As a data transmission medium, the optical fiber has advantages of wide frequency bandwidth, high capacity, low loss, long transmission distance and anti-electromagnetic interference which have become more significant. But currently, in the field of multimedia transmission, a copper cable is still mostly used as data transmission line. The copper cable has a small amount of data transmission, supports only short-distance transmission, and cannot meet the requirements of high-resolution and high-speed data transmission.

Based on this background, multicore multichannel photoelectric system has arisen. With a photoelectric conversion module, a multimedia electrical signal is converted to an optical signal which is, by an optical transmitting module transmitted to another end through an optical fiber, and then converted back to a multimedia electrical signal by an optical receiving module. Thus, signal transmission is performed in the optical fiber, which greatly increases data transmission capacity and transmission distance, and meanwhile meets the requirements of high-resolution and high-speed data transmission.

For example, there are MPO (Multi Fiber Push On) type optical fiber connector and QSFP (Quad Small Form-factor Pluggable) interface which are multicore multichannel pluggable connectors in the prior art, but they have following drawbacks:

1. The MPO interface is merely a simple physical interface, a corresponding receiver and a transmitter need to be added when performing information transmission therewith;
2. The lens used in the QSFP has a large volume, and meanwhile the distance between optical fibers is fixed to 250 μm, therefore an array of information receiving units and information transmitting units must be used.

Besides, there are also following deficiencies in the multicore multichannel pluggable connector in the prior art:

1. Current multimedia transmission lines are mainly copper cables or other metal media, which leads to high cost, short transmission distance and poor performance;
2. No bare die array structure for transmitting and receiving is provided in the current signal transmission structure of the photoelectric module;
3. No multichannel integrated module for transmission is provided in the current photoelectric module.

SUMMARY

The object of the present invention is to provide a photoelectric converter and a photoelectric connection device. Information transmitting chips and information receiving chips are provided in the same photoelectric converter, each information transmitting chip transmitting information through a corresponding optical fiber and each information receiving chip receiving information through a corresponding optical fiber, thus multichannel optical fiber transmission can be achieved in an integral manner.

According to one aspect of the present invention, a photoelectric converter is provided, which comprises a housing, wherein a driving controller, at least one information transmitting chip and at least one information receiving chip are provided on a substrate in the housing, wherein:

The information transmitting chip, under the control of the driving controller, converts an electrical signal to be transmitted to an optical signal and transmits the optical signal through an optical fiber corresponding to the information transmitting chip;

The information receiving chip, under the control of the driving controller, converts an external input optical signal that has reached a receiving surface of the information receiving chip to an electrical signal and outputs the electrical signal, wherein the external input optical signal is transmitted through an optical fiber corresponding to the information receiving chip.

In an embodiment, the photoelectric converter further comprises a lens, the lens comprising a first surface, a second surface and a third surface, wherein:

The information transmitting chip transmits the optical signal to the lens, the optical signal enters the lens through the first surface of the lens and is transmitted out of the lens from the third surface after being reflected from the second surface, and is transmitted through the optical fiber corresponding to the information transmitting chip;

The external input optical signal transmitted through an optical fiber corresponding to the information receiving chip enters the lens through the third surface of the lens, and is transmitted out of the lens from the first surface after being reflected from the second surface, and then reaches the receiving surface of the information receiving chip.

In an embodiment, convergent lenses are provided on the first surface and the third surface of the lens.

In an embodiment, the information transmitting chip is a vertical cavity surface emitting laser, and the information receiving chip is a photo detector.

In an embodiment, the distance between the chips is greater than 250 μm. For example, the distance between the chips can be 350 or 500 μm and so forth.

In an embodiment, the substrate is a printed circuit board, the material of which is a metallized ceramic or organic medium.

According to another aspect of the present invention, a photoelectric connection device is provided, comprising a photoelectric converter and an adapter, wherein the photoelectric converter comprises the photoelectric converter involved in any one of the embodiments described above; the adapter comprises a body, a groove for placing optical fibers being provided on the body, wherein each optical fiber corresponds to an information transmitting chip or an information receiving chip in the photoelectric converter, respectively.

In an embodiment, the distance between the optical fibers is greater than 250 μm. For example, the distance between the optical fibers can be 350 or 500 μm and so forth.

In an embodiment, the adapter is connected to the photoelectric converter by a fixing member.

In an embodiment, the fixing member comprises a fixing column provided on the housing of the photoelectric converter, and a fixing hole provided on the body of the adapter for matching with the fixing column.

With information transmitting chips and information receiving chips provided in the same photoelectric converter in the present invention, each information transmitting chip transmitting information through a corresponding optical fiber and each information receiving chip receiving information through a corresponding optical fiber, multichannel optical fiber transmission can be achieved in an integral manner.

BRIEF DESCRIPTION OF THE DRAWINGS

The drawings illustrated herein, which constitute part of this application, are used for providing a further understanding of the present invention. Exemplary embodiments and description thereof are used for explaining the present invention, and are not for limiting the present invention. In the drawings.

DETAILED DESCRIPTION

The present invention will be further described below in detail in conjunction with the accompanying drawings and embodiments.

Figure 1:
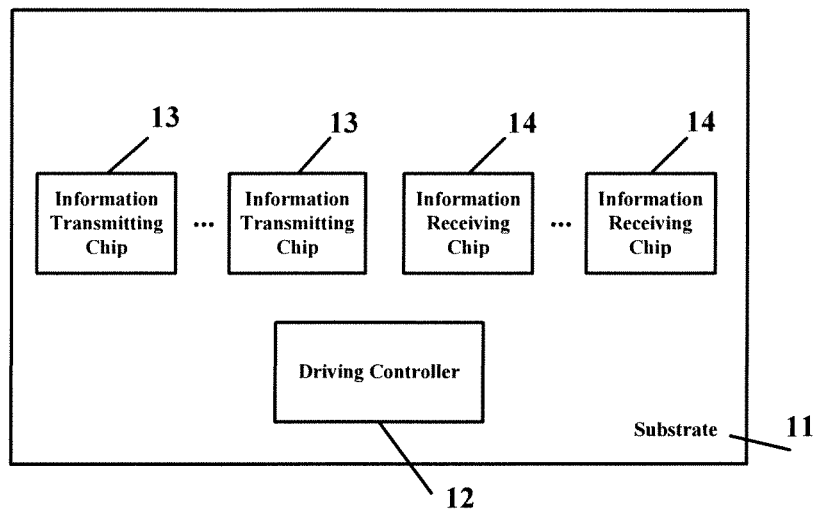
FIG. 1 is a schematic diagram of a photoelectric converter according to an embodiment of the present invention.

FIG. 1 is a schematic diagram of the photoelectric converter according to an embodiment of the present invention. As shown in FIG. 1, the photoelectric converter comprises a housing, wherein a driving controller 12, at least one information transmitting chip 13 and at least one information receiving chip 14 are provided on a substrate 11 in the housing.

The information transmitting chip 13, under the control of the driving controller 12, converts an electrical signal to be transmitted to an optical signal, and transmits the optical signal through an optical fiber corresponding to the information transmitting chip.

The information receiving chip 14, under the control of the driving controller, converts an external input optical signal that has reached a receiving surface of the information receiving chip 14 to an electrical signal and outputs the electrical signal, wherein the external input optical signal is transmitted through an optical fiber corresponding to the information receiving chip.

Based on the photoelectric converter according to the embodiment of the present invention described above, information transmitting chips and information receiving chips are provided in the same photoelectric converter, each information transmitting chip transmitting information through a corresponding optical fiber and each information receiving chip receiving information through a corresponding optical fiber, thus multichannel optical fiber transmission can be integrally achieved.

Preferably, the information transmitting chip can comprise VCSEL (Vertical Cavity Surface Emitting Laser), and the information receiving chip can comprise PD (Photo Detector).

Preferably, the distance between the chips on the substrate is adjustable, for example, the distance between the chips can be greater than 250 µm. For example, the distance between the chips can be 350 or 500 µm and so forth. Preferably, the substrate comprises a printed circuit board, the material of which can comprise metallized ceramic or organic medium, or other suitable material.

As a ceramic substrate is used, a good heat dissipation performance and a good insulating property can be achieved, and also the dielectric constant can be maintained stable for the photoelectric converter.

Figure 2:
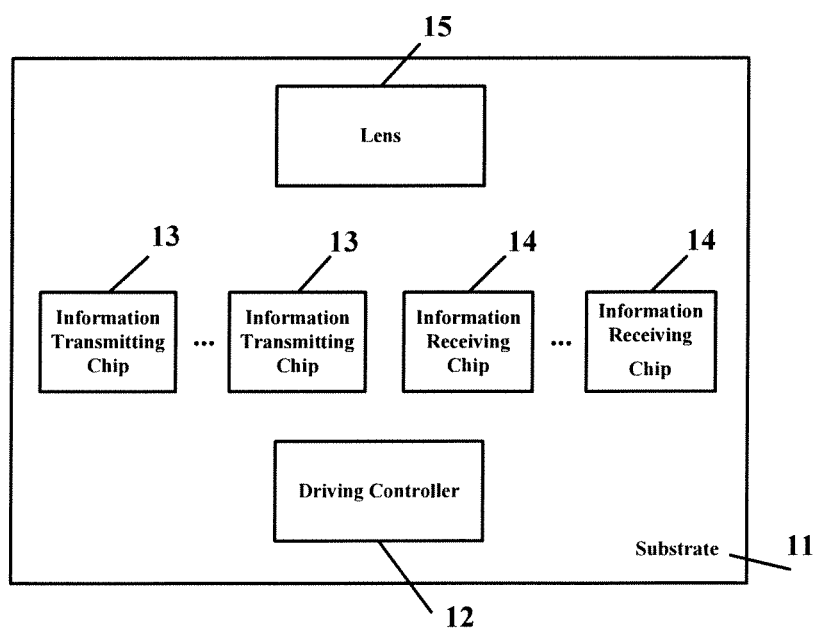
FIG. 2 is a schematic diagram of a photoelectric converter according to another embodiment of the present invention.

FIG. 2 is a schematic diagram of the photoelectric converter according to another embodiment of the present invention. Compared with the embodiment shown in FIG. 1, a lens 15 may further be provided in the photoelectric converter for the convenience of information transmission. The lens may comprise a first surface 151, a second surface 152 and a third surface 153, as shown in FIG. 3 and FIG. 4.

Information transmission will be described below by specific examples of the present invention.

Figure 3:
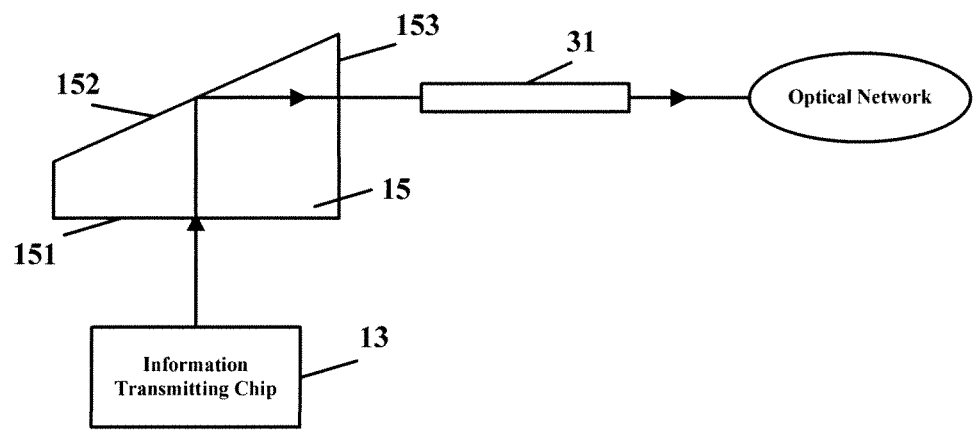
FIG. 3 is a schematic diagram for illustrating transmitting information according to an embodiment of the present invention.

FIG. 3 is a schematic diagram for illustrating transmitting information according to an embodiment of the present invention. As shown in FIG. 3, when transmitting information, the information transmitting chip 13 transmits an optical signal to the lens 15. The optical signal enters the lens through the first surface 151 of the lens 15 and is transmitted out of the lens from the third surface 153 after being reflected from the second surface 152, and then is sent to optical network through an optical fiber 31 corresponding to the information transmitting chip 13.

Figure 4:
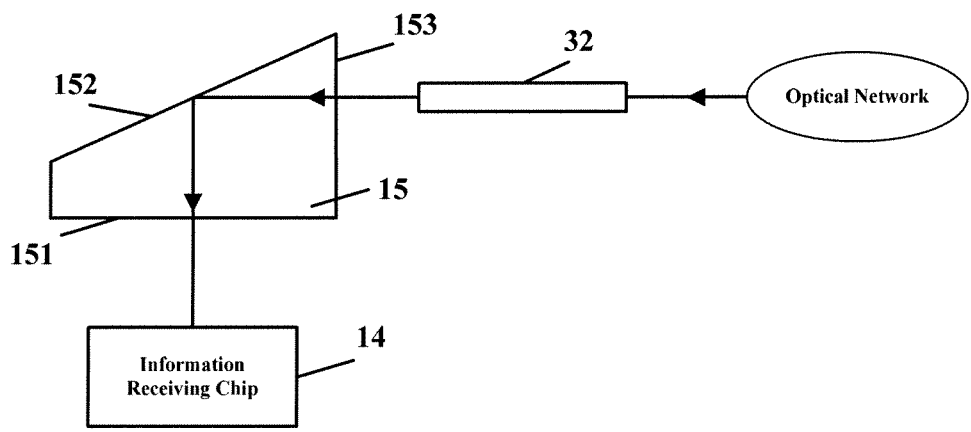
FIG. 4 is a schematic diagram for illustrating receiving information according to an embodiment of the present invention.

FIG. 4 is a schematic diagram for illustrating receiving information according to an embodiment of the present invention. As shown in FIG. 4, when receiving information, the external input optical signal that is transmitted through an optical fiber 32 corresponding to the information receiving chip 14 enters the lens 15 through the third surface 153 of the lens 15, and is transmitted out of the lens from the first surface 151 after being reflected from the second surface 152, and then reaches the receiving surface of the information receiving chip 14. Preferably, the included angle between the third surface 153 of the lens 15 and the optical signal is 45°.

Preferably, in order to achieve light convergence, convergent lenses can be provided on the first surface 151 and the third surface 153 of the lens 15.

It should be noted that since at least one information transmitting chip 13 and at least one information receiving chip 14 are provided on the substrate 11 in the housing, multichannel optical fiber transmission can be integrally achieved.

Figure 5:
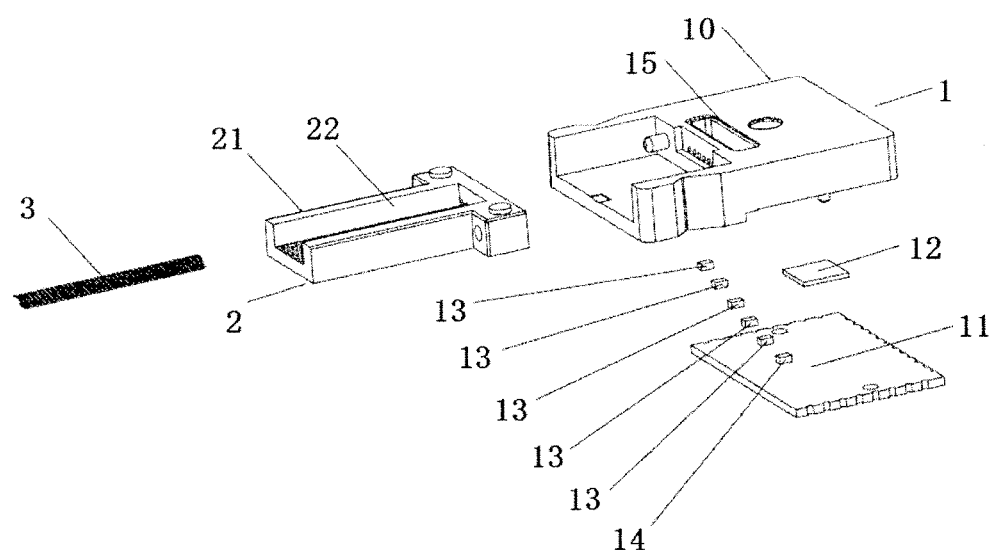
FIG. 5 is a schematic diagram of a photoelectric connection device according to an embodiment of the present invention.

FIG. 5 is a schematic diagram of the photoelectric connection device according to an embodiment of the present invention. As shown in FIG. 5, the photoelectric connection device comprises a photoelectric converter 1 and an adapter 2. The photoelectric converter 1 can comprise the photoelectric converter involved in any one of the embodiments as shown in FIGS. 1-4. For example, the photoelectric converter 1 comprises a housing 10, wherein a driving controller 12, at least one information transmitting chip 13, at least one information receiving chip 14, and a lens 15 are provided on the substrate 11 in the housing 10.

The adapter 2 comprises a body 21, a groove 22 for placing an optical fiber 3 being provided on the body, wherein each optical fiber corresponds to an information transmitting chip 13 or an information receiving chip 14 in the photoelectric converter, respectively.

Based on the photoelectric converter according to the embodiment of the present invention described above, information transmitting chips and information receiving chips are provided in the same photoelectric converter, each information transmitting chip transmitting information through a corresponding optical fiber and each information receiving chip receiving information through a corresponding optical fiber, thus multichannel optical fiber transmission can be integrally achieved.

As an example, only one information receiving chip 14 is illustrated in FIG. 5. Those skilled in the art will understand that the number of the information transmitting chips and the information receiving chips can be adjusted freely.

It should be noted that since at least one information transmitting chip 13 and at least one information receiving chip 14 are provided on the substrate 11 of the housing 10, the optical fiber 3 can include an optical fiber 31 corresponding to the information transmitting chip 13 and an optical fiber 32 corresponding to the information receiving chip 14, correspondingly.

Preferably, the distance between the optical fibers is adjustable. For example, the distance between the chips can be greater than 250 μm. The distance between the chips may be 350 or 500 μm and so forth.

Figure 6:
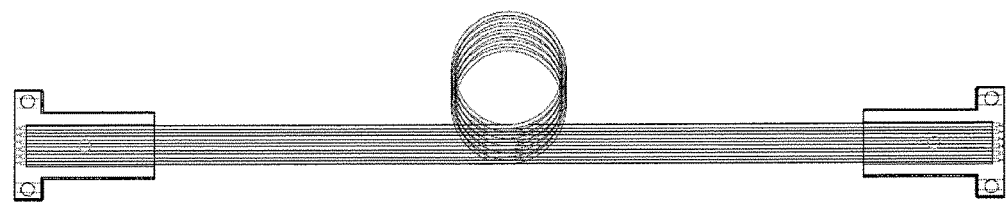
FIG. 6 is a schematic diagram of connection of optical fibers according to an embodiment of the present invention.

As an example, when a six-core multimode optical fiber is adopted, if the photoelectric connection device of FIG. 5 is to be used as a transmitter, five (5) information transmitting chips 13 and one (1) information receiving chip 14 can be provided on the substrate 11 in the housing 10 in such a case, as illustrated in FIG. 5, for example. Correspondingly, if the photoelectric connection device of FIG. 5 is to be used as a receiver, one (1) information transmitting chip 13 and five (5) information receiving chips 14 can be provided on the substrate 11 in the housing 10. The connection of the transmitter and the receiver is shown in FIG. 6.

For example, the information transmitting chip(s), the information receiving chip(s) and the driving controller are placed on a ceramic substrate by use of an automatic chip mounter, and are connected to each other with a conductive silver paste which is cured by baking at a high temperature. The information transmitting chip(s), the information receiving chip(s) and the driving controller can be connected with gold wire with use of a gold wire bonding machine.

Further, as to the connection between the multicore multimode optical fiber 3 and the adapter 2, a 353ND paste and a UV paste are used to secure and couple the optical fiber and the adapter at a corresponding vacant site. An optical fiber polishing process is employed to modify the end face of the optical fiber to control the insertion loss and return loss of the optical fiber, so as to meet the requirements of transmission.

The bonding of the lens 5 and the housing 10 is performed in a dispensing (where the housing is of plastic type) or tight fitting (where the housing is of metal type) manner using a semi-active coupling.

In an embodiment, the adapter 2 is connected to the photoelectric converter 1 by a fixing member.

Preferably, the fixing member comprises a fixing column provided on the housing of the photoelectric converter, and a fixing hole provided on the body of the adapter for matching with the fixing column, as shown in FIG. 5.

According to the present invention, one or more of the following beneficial effects can be obtained:

1. By adopting multimode multicore optical fiber for transmission, it is convenient for coupling.

2. The distance between chips (optical fibers) is greater than 250 m, for example, the distance between the chips (optical fibers) may be 350 or 500 m and so forth. Thus, a single VCSEL and PD may be used for DB, with lower cost as compared with an array of VCSEL and PD. Furthermore, the number of VCSEL and PD may be determined flexibly as needed.

3. The information transmitting chip(s), the information receiving chip(s) and the driving controller(s) are sealed in the housing with the lens, resulting in a longer lifespan.

4. The VCSEL, PD and optical fiber suitable for various wavelengths can be altered to meet the requirements of different customers.

5. The ceramic substrate is used with a good heat dissipation performance.

6. It has a small size and is convenient for use in a variety of devices.

7. It can be used as an integrated module, thus can be directly assembled.

8. Operation is simple and is suitable for batch production.

The descriptions of the present invention are given for illustration and description, not for being exhaustive or limiting the present invention to the precise forms disclosed. Many modifications and changes are obvious to those skilled in the art. Embodiments are selected and described for a better illustration of the principles and practical applications of the present invention, and make those skilled in the art understand the present invention and design various embodiments with various modifications suitable for particular purposes.

What is claimed is:

1. A photoelectric converter, characterized in comprising a housing, wherein a driving controller, at least one information transmitting chip and at least one information receiving chip are provided on a substrate in the housing, wherein:
    the information transmitting chip, under the control of the driving controller, converts an electrical signal to be transmitted to an optical signal and transmits the optical signal through an optical fiber corresponding to the information transmitting chip;
    the information receiving chip, under the control of the driving controller, converts an external input optical signal that has reached a receiving surface of the information receiving chip to an electrical signal and outputs the electrical signal, wherein the external input optical signal is transmitted through an optical fiber corresponding to the information receiving chip;
    wherein the photoelectric converter further comprises a lens, the lens comprising a first surface, a second surface and a third surface, wherein:
    the information transmitting chip transmits the optical signal to the lens, the optical signal enters the lens through the first surface of the lens and is transmitted out of the lens from the third surface after being reflected from the second surface, and is transmitted through the optical fiber corresponding to the information transmitting chip;
    the external input optical signal transmitted through the optical fiber corresponding to the information receiving chip enters the lens through the third surface of the lens, and is transmitted out of the lens from the first surface after being reflected from the second surface, and then reaches the receiving surface of the information receiving chip.

2. The photoelectric converter according to claim 1, characterized in that convergent lenses are provided on the first surface and the third surface of the lens.

3. The photoelectric converter according to claim 1, characterized in that the information transmitting chip is a vertical cavity surface emitting laser; and the information receiving chip is a photo detector.

4. The photoelectric converter according to claim 1, characterized in that the distance between the optical fibers is greater than 250 μm.

5. The photoelectric converter according to claim 1, characterized in that the substrate is a printed circuit board, the material of which is a metallized ceramic or organic medium.

6. A photoelectric connection device, characterized in comprising:
   a photoelectric converter and an adapter,
      wherein the photoelectric converter comprises said photoelectric converter according to claim 1;
      the adapter comprises a body, a groove for placing optical fibers being provided on the body, wherein each optical fiber corresponds to an information transmitting chip or an information receiving chip in the photoelectric converter, respectively.

7. The photoelectric connection device according to claim 6, characterized in that the distance between the optical fibers is greater than 250 μm.

8. The photoelectric connection device according to claim 6, characterized in that the adapter is connected to the photoelectric converter by a fixing member.

9. The photoelectric connection device according to claim 8, characterized in that the fixing member comprises a fixing column provided on the housing of the photoelectric converter, and a fixing hole provided on the body of the adapter for matching with the fixing column.

* * * * *